United States Patent
O'Rourke et al.

(10) Patent No.: US 7,117,436 B1
(45) Date of Patent: Oct. 3, 2006

(54) GENERATING A WEB PAGE BY REPLACING IDENTIFIERS IN A PRECONSTRUCTED WEB PAGE

(75) Inventors: Cameron Gene O'Rourke, San Ramon, CA (US); Matthew Scott Piermarini, Edgewater, MD (US); David Christopher Knox, Chantilly, VA (US)

(73) Assignee: Oracle Corporation, Redwood Shores, CA (US)

( * ) Notice: Subject to any disclaimer, the term of this patent is extended or adjusted under 35 U.S.C. 154(b) by 849 days.

(21) Appl. No.: 09/654,998

(22) Filed: Aug. 31, 2000

(51) Int. Cl.
*G06N 3/00* (2006.01)
(52) U.S. Cl. .................................... 715/517
(58) Field of Classification Search ................ 715/517, 715/501.1, 522, 513, 514, 51, 523, 530; 713/401; 707/1; 719/315; 709/229
See application file for complete search history.

(56) References Cited

U.S. PATENT DOCUMENTS

| | | | | |
|---|---|---|---|---|
| 5,835,712 A | * | 11/1998 | DuFresne | 709/203 |
| 5,845,303 A | * | 12/1998 | Templeman | 715/517 |
| 5,860,073 A | * | 1/1999 | Ferrel et al. | 715/522 |
| 5,987,480 A | * | 11/1999 | Donohue et al. | 715/501.1 |
| 6,055,522 A | * | 4/2000 | Krishna et al. | 715/517 |
| 6,292,889 B1 | * | 9/2001 | Fitzgerald et al. | 713/1 |
| 6,356,920 B1 | * | 3/2002 | Vandersluis | 715/501.1 |
| 6,542,933 B1 | * | 4/2003 | Durst et al. | 709/229 |
| 6,651,108 B1 | * | 11/2003 | Popp et al. | 719/315 |
| 6,748,549 B1 | * | 6/2004 | Chao et al. | 713/401 |
| 6,763,343 B1 | * | 7/2004 | Brooke et al. | 707/1 |
| 2001/0011226 A1 | * | 8/2001 | Greer et al. | 705/14 |

OTHER PUBLICATIONS

Ladd, Eric, et al. Using HTML 4, XML, and Java 1.2. 1999, Que. Platinum Edition. pp. 850-852.*

* cited by examiner

*Primary Examiner*—Stephen Hong
*Assistant Examiner*—Kyle Stork
(74) *Attorney, Agent, or Firm*—Hickman Palermo Truong & Becker LLP; Christopher J. Brokaw

(57) ABSTRACT

A system and method for dynamically generating Web content using a parse tree is described. A template describing a dynamically generated Web page is built. The template includes a script written in a tag-delimited page description language. One or more markers included within the template each indicate a relative location within the Web page for dynamic content insertion. The hierarchical nature of the page description language is used to infer a set of display regions, which are referenced by a parse tree. The parse tree includes a plurality of nodes structured into levels. Each node corresponds to structural tags specified within the script. Each successive level represents a further nesting of the structural tags within the script. A controller program invokes a document engine and specifies a particular template. Each marker may be substituted with dynamic content zero, one or several times each. The document engine accepts substitution requests from the controlling program and implements specific inclusion rules that ensure well-formed output documents. The dynamic content is inserted into the display region for the substituted marker. Each node located in a level of the parse tree previous to the node corresponding to the substituted marker is processed. The output structure is scanned and the document is rendered with the dynamic content included therein.

24 Claims, 9 Drawing Sheets

35

```
 1  <HTML>
 2    <HEAD>
 3      <TITLE>Companies</TITLE>
 4    </HEAD>
 5    <BODY>
 6      <TABLE border="1">
 7        <TR>
 8          <TH colspan="99">Listed Companies</TH>
 9        </TR>
10        <TR ID="MYROW">
11          <TD><A href="#HREF#">#SYMBOL#</A></TD>
12          <TD>#COMPANY#</TD>
13        </TR>
14      </TABLE>
15    </BODY>
16  </HTML>
```

GENERATING A WEB PAGE BY REPLACING IDENTIFIERS IN A PRECONSTRUCTED WEB PAGE

FIELD OF THE INVENTION

The present invention relates in general to dynamic Web content and, in particular, to a system and method for dynamically generating Web document content using a rules-based engine and implicit template hierarchy.

BACKGROUND OF THE INVENTION

Information technology continues to evolve as new forms of mass communications reach out to a broader and increasingly diverse audience. Recently, the Web, shorthand for "Worldwide Web," has introduced yet another form of mass communications based on the concept of a multimedia Web "site." A Web site is actually a collection of individually downloadable Web pages, generally with a common theme and structure, with embedded hyperlinks connecting the Web pages to other related Web pages and content.

Web sites are authored by individual users and organizations, known as content providers, and are published for retrieval on host computer systems. Web site publishing is primarily computer network-based and requires a three-part support infrastructure. First, individual users execute browser applications for viewing Web pages on client computer systems. Second, content providers execute server applications on host computer systems. Finally, the host computer systems must be interconnected to each client computer system via a data network or similar form of interconnectivity. The data network can include intranetworks, also known as local area networks, and wide area networks, including public information internetworks, such as the Internet, and various combinations thereof.

Web pages can consist of plain or formatted text, images, sound or video clips, and other types of content. Each Web page is actually transmitted as an Hypertext Markup Language (HTML) script. HTML is a tag-delimited, page description programming language. Tags specify page layout and formatting instructions. The Web pages are downloaded and interpreted by a Web browser application.

Most Web pages written in HTML are static with relatively unchanging content. HTML Web pages are self-contained scripts. Changing the content requires recoding the Web page prior to download. Recoding, though, imposes a maintenance burden on content providers who want to make periodic content changes to their Web sites.

Nonetheless, many Web pages need to be regularly updated to reflect changing conditions, such as stock prices, news, database updates, and countless other types of information. Moreover, Web pages personalized for individual users encourage repeat visits to the Web site. Consequently, dynamic Web pages have become increasingly popular.

In the prior art, there are four categories of commonly used approaches for providing dynamic Web page content.

A first approach generates Web pages by embedding HTML directly into the source code. A compiled or interpreted program is written in a high order programming or scripting language, such as Java, PL/SQL, Perl, or C, to generate Web pages at runtime. These programs are invoked by a variety of methods and frameworks such as Servlets (Java), CGI (Perl and C), and COM Objects (C). The logic controlling the creation of dynamic content is embodied within the program. However, as with static Web pages, restructuring the generated Web pages in terms of appearance and changes in content type requires recoding the underlying program. The look and feel of the resultant Web pages are potentially spread across several procedures. Moreover, thusly encoded Web pages cannot be easily visualized, as the HTML scripts are only generated at runtime and cannot be edited using conventional Web publishing tools.

A second approach employs the reverse technique. Source code written in a higher order programming or scripting language is placed into Web page HTML code and is interpreted at runtime. Examples of this approach include ColdFusion, ASP (Active Server Pages) and JSP (Java Server Pages). Source code segments are placed directly into the HTML code. Tags or similar delimiters separate the source code segments from the page script. At runtime, a server executes the source code to generate a complete Web page. However, the source code is intrusive and can make using conventional Web editing tools difficult. The look and feel of a Web site can also be spread across several pages, imposing a maintenance burden. Finally, the application logic and user interface are not cleanly separated. Consequently, programmers and Web page artists find simultaneously working on the same page difficult.

A third approach requires the use of design-by-specification tools. These types of tools generate code or perform runtime interpretation of the specifications. Nevertheless, these types of tools are ill suited for creating commercial Web sites as the page layouts are generally inflexible and the HTML code most often cannot be directly manipulated by a page artist. Moreover, this approach is generally optimized for database transactions and therefore inappropriate for many types of Web sites.

Finally, a fourth category of approaches involves complex, proprietary or unproven technologies that are generally beyond the capabilities of most page artists and programmers working in corporate information technology departments. These technologies typically do not allow page artists to design Web page look and feel using conventional HTML editing tools, nor do these technologies provide adequate facilities to enable concurrent development. Moreover, the programming models are typically complex such that simple tasks, such as iteration and defining optional display regions, are difficult to accomplish.

Consequently, there is a need for an integrated solution to providing dynamic Web pages that cleanly separates the tasks of user interface design from application logic programming. Such a solution would allow for the complete separation of HTML code from program logic code while simultaneously providing for the generation of complex Web page designs. Such a solution would also allow page designers to work concurrently with application programmers on the same Web page.

There is a further need for a dynamic Web page generation approach that allows page artists to design and visualize Web pages using conventional HTML code editing tools. Such a solution would take advantage of the structure inherent in HTML documents to describe the various displayable regions in a simple and unobtrusive manner.

SUMMARY OF THE INVENTION

The present invention provides for a system and method for generating dynamic document content, particularly Web pages, encoded in a tag-delimited, page description language, such as HTML. A document engine accepts document templates containing positional markers and applies transformation rules according to substitution directives.

The document templates represent the sum of all potential document elements. Each template is prepared in a common page description language for which visual editing tools are readily available.

One or more markers can be included within the template. Each marker indicates a relative position within the document for dynamic content insertion. The specific syntax of the markers within the template documents are such that the templates can be visually inspected and modified free of visual distractions and program code artifacts. The embedded markers convey no semantics other than position within the template document.

A controller program, written for the purpose of generating a document with dynamic content, invokes the document engine and specifies a particular template. The template document is read into the document engine and a hierarchical structure of display regions is created. The hierarchical nature of the page description language is used to infer the set of regions suitable for inclusion in, repetition within, or deletion from the output document. Display regions are inferred by examining the implicit structure of the template document.

The controller program directs the engine to substitute markers within the template with dynamic content. The document engine implements specific transformation rules that allow templates to be manipulated to produce arbitrarily complex output documents. The document engine accepts directives from the program and creates the output document.

As an overview, the Web content is generated using Hypertext Templates (HTT). A template specifying all of the potential visual elements of a dynamic Web page, or portion of a Web page is prepared using a common Web page editor such as Microsoft Front-Page or Macromedia Dream Weaver. The template is preferably written in HTML. One or more markers is included in the template to indicate a relative position for dynamic content. The markers are simple strings and take the form of an identifying name, surrounded by a pair of pound signs. The markers can be placed anywhere within the HTML document, including inside HTML elements.

The template is uploaded into database storage using a template manager application. The template manager application allows templates to be maintained, catalogued, and viewed. A controller program, written in either Java or Oracle PL/SQL, invokes an HTT engine and specifies a particular template. The template version and subtype can also be specified. The HTT engine locates and parses the template and creates an in-memory hierarchical structure of linked nodes that each represent a particular display region within the template. The display regions are inferred by examining the implicit structure of the template, and also by looking for HTML identifier attributes. Attributes of the display regions, such as name, offset into the template, length, and type, are stored.

The controller program makes substitution calls to the HTT engine specifying markers and dynamic content to be placed at the marker location. The HTT engine responds to substitution calls from the controller program and creates a hierarchical structure of output regions representing an ordered list of display regions that are to be included in the output document. Those display regions not having embedded markers, that is, only consisting of static content, are simply added to the output structure. Those display regions and any encapsulating parent display regions which contain markers and for which dynamic content is specified are added to the output structure. Those display regions and any encapsulating display regions that contain markers but do not have dynamic content specified are omitted from the output structure. Markers can be specified for substitution multiple times, causing specific display regions to be repeated in the output structure.

The controller program indicates that it is ready for the Web page to be displayed. The HTT engine scans the output structure to determine the output order of the display regions. For each output region, the static content is retrieved from the template and inserted into an output buffer and dynamic content is inserted into the output buffer at the position indicated by the substitution marker. Each output region that is hierarchically superior to the node being processed, and that has not already been included in the output buffer, is also processed in a recursive fashion. Finally, the Web page, consisting of well-formed HTML, is read from the output buffer and returned to the Web browser.

An embodiment of the present invention is a system and method for dynamically generating Web content using a parse tree. A template describing a dynamically generated Web page is built. The template includes a script written in a tag-delimited page description language. One or more markers included within the template each indicate a relative location within the Web page for dynamic content insertion. Display regions are defined via a parse tree. The parse tree includes a plurality of nodes structured into levels. Each node corresponds to structural tags specified within the script. Each successive level represents a further nesting of the structural tags within the script. Each marker is substituted with dynamic content. The dynamic content is inserted into the display region for the substituted marker. Each node located in a level of the parse tree previous to the node corresponding to the substituted marker is processed. The Web page script is served into an output buffer with the dynamic content included therein.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
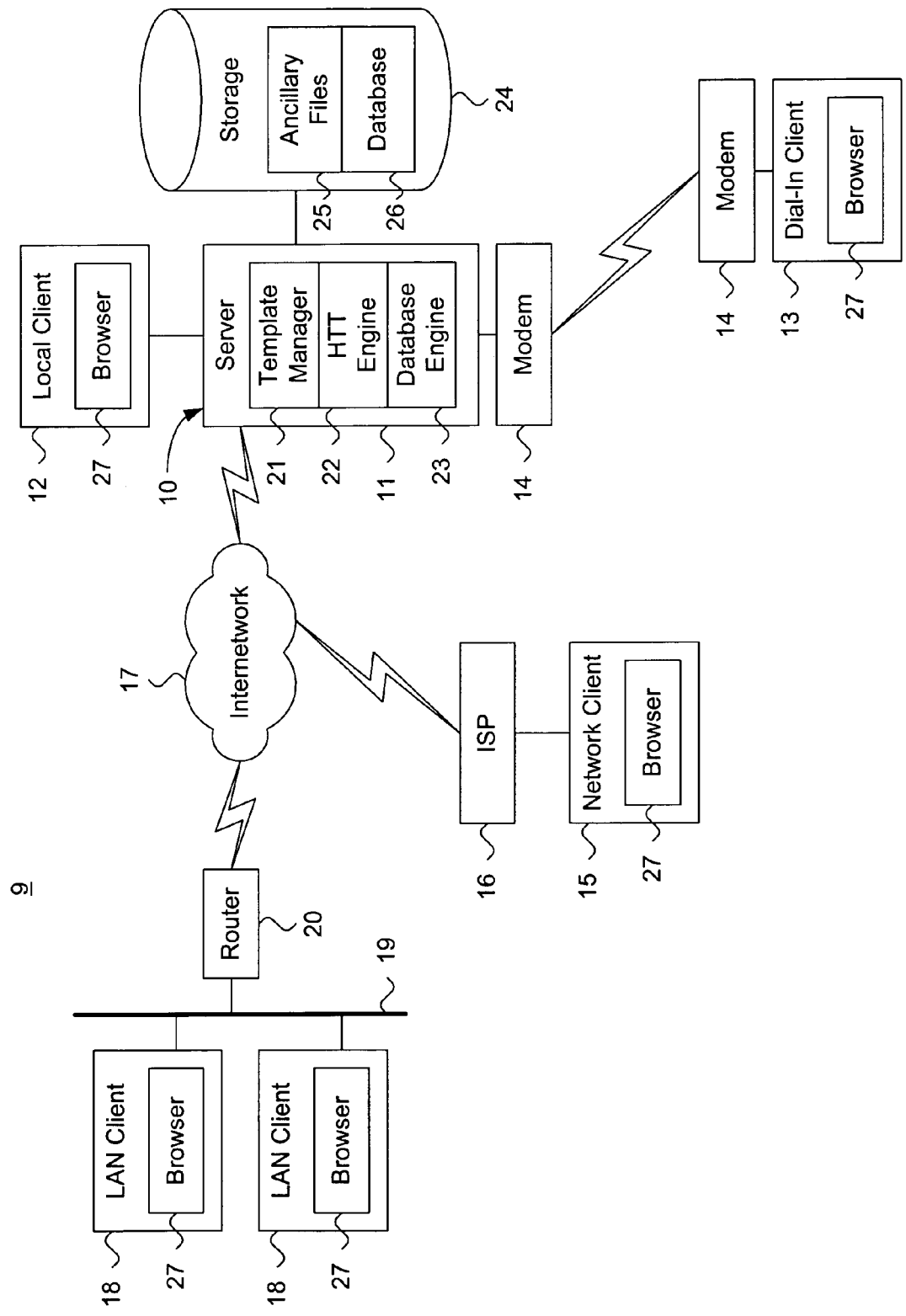
FIG. 1 is a block diagram showing a distributed computing environment, including a system for dynamically generating Web document content using a rules-based engine and implicit template hierarchy, in accordance with the present invention.

FIG. 1 is a block diagram showing a distributed computing environment 9, including a system 10 for dynamically generating Web document content using a rules-based engine and implicit template hierarchy, in accordance with the present invention. The system 10 consists of a server 11 operating on a host computer system that serves Web pages and content to a plurality of clients.

Various types of clients can be interconnected to the server 11. These clients include a local client 12 interconnected directly to the server 11 and a dial-in client 13 interconnected via a set of modems 14. In addition, a network client 15 can be interconnected through an Internet service provider (ISP) 16 that is interconnected to the server 11 via an internetwork 17, including the Internet. Similarly, one or more local area network (LAN) clients 18 can be interconnected to the server 11 via an intranetwork 19 that is itself interconnected to the internetwork 17 via a router 20 or similar device. Other types of clients, network topologies and configurations, and forms of interconnection are feasible.

In addition to performing those tasks ordinarily associated with hosting network services, the server 11 executes three principal applications: a template manager 21, a hypertext template (HTT) engine 22, and a database engine 23. In addition, the server 11 includes a secondary storage device 24 in which ancillary files 25 and a database 26 are maintained. The template manager 21 loads templates into the database 26. The HTT engine 22 accepts commands and transforms templates into generate dynamic content. Finally, the database engine 23 is the primary interface between the server 10 and the databases 26 and is used to maintain and interrogate the databases 26. The template manager 21, HTT engine 22, database engine 23, ancillary files 25, and database 26 are further described below with reference to FIG. 2.

The server 11 receives requests from clients and sends replies in the form of Web pages and content over the "Web." Clients view the Web pages and content on browser applications 27. Browser applications 27 suitable for use in the present invention include the Internet Explorer, licensed by Microsoft Corporation, Redmond, Wash., and the Navigator, licensed by Netscape Corporation, Mountain View, Calif.

The Web, shorthand for "Worldwide Web," loosely refers to session-oriented data communications occurring in a networked computing environment and conforming to the Hypertext Transport Protocol (HTTP). HTTP communications usually occur over Transmission Control Protocol/Internet Protocol-based (TCP/IP) data networks, although other types of packet switched data networks also support HTTP. The HTTP suite is described in W. R. Stevens, "TCP/IP Illustrated," Vol. 3, Chs. 13–14, Addison-Wesley (1996), and the TCP/IP suite is described in W. R. Stevens, "TCP/IP Illustrated," Vol. 1, Ch. 1 et seq., Addison-Wesley (1994), the disclosures of which are incorporated herein by reference.

The individual computer systems, including the server 11 and clients 12, 13, 15, 18, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
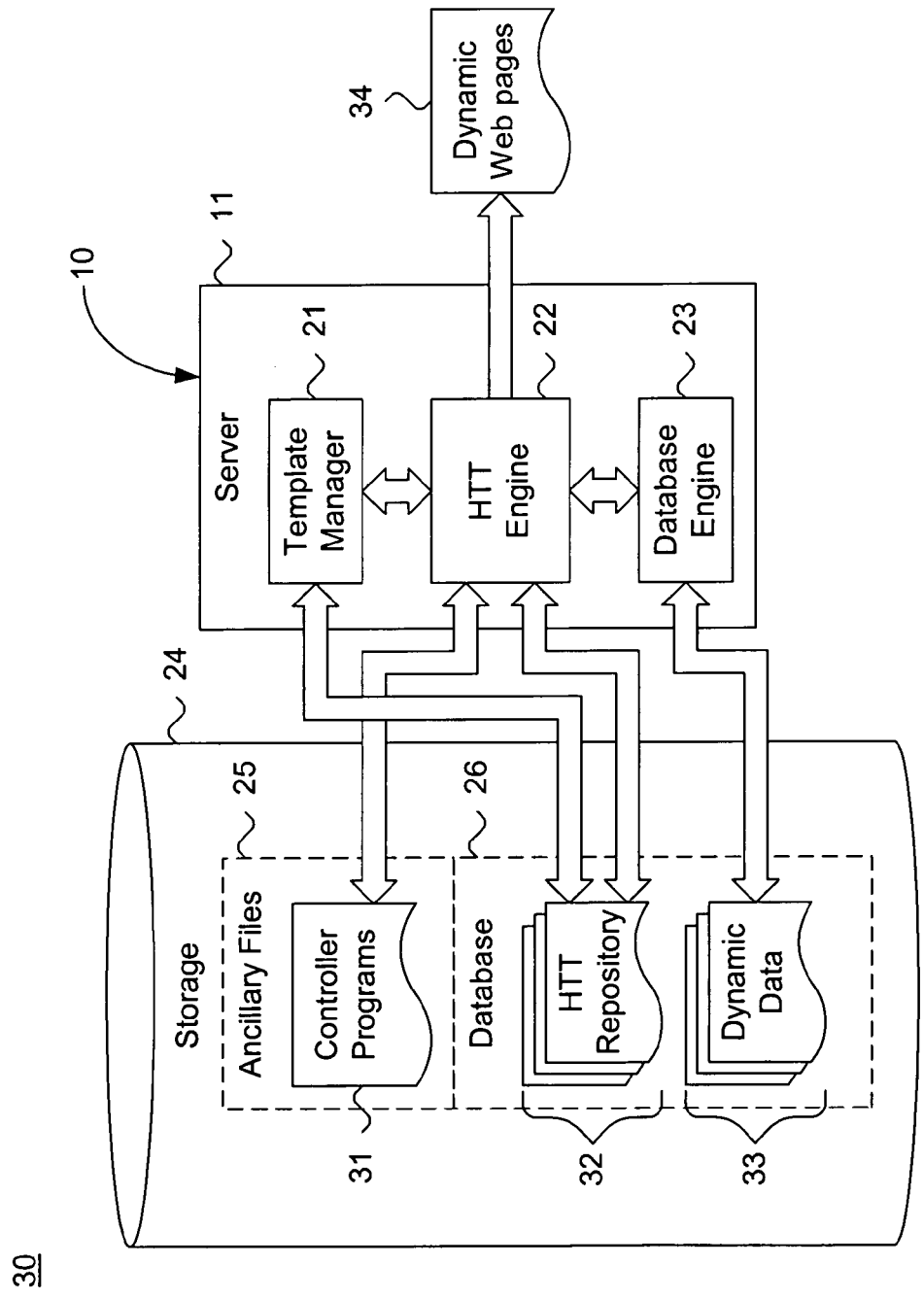
FIG. 2 is a detail block diagram showing the system for dynamically generating Web content of FIG. 1.

FIG. 2 is a detail block diagram showing the system 10 for dynamically generating Web content of FIG. 1. The server 11 consists of three functional modules: template manager 21, HTT engine 22, and database engine 23. The template manager 21 maintains an HTT template repository 32 within the database 26. Each HTT template is a modified Web page initially written as an interpretable script in a tag-delimited page description language, such as HTML or XML. Markers are embedded into the script at locations where dynamic content will appear. The template manager 21 uploads the HTT templates into the HTT template repository 32.

The HTT engine 22 generates dynamic Web pages 34 by substituting the markers embedded within the HTT templates with dynamic content according to controller programs 31. Each controller program 31 specifies a dynamic Web page to be generated as a series of commands, as further described below with reference to FIG. 4. In the described embodiment, each controller program 31 is written in either Java or Oracle PL/SQL. The controller program 31 invokes the HTT engine 22, specifies an HTT template, and makes substitution calls to the HTT engine 22. In the case of PL/SQL, each PL/SQL controller program 35 is stored in and is executed by the database 26. In the case of Java, a Java program, typically a Servlet, is invoked by a Servlet runner or application server (not shown) and the Servlet in turn invokes the HTT engine 22. The dynamic Web pages are generated as HTML, although other tag-delimited, page description languages could be used.

Finally, the database engine 23 interfaces to the database 26 and is used to maintain and execute queries on the database 26. In particular, the database engine 23 enables the HTT Engine 22 to combine dynamic data 33 stored in the database 26 with the HTT templates to generate the dynamic Web pages 34.

In the present embodiment, the template manager 21 and HTT engine 22 execute inside the database 26. The template manager 21 is written in PL/SQL, which is executed by the database 26 and the HTT engine 22 is written in Java, which is also executed by the database 26. Other configurations are possible—we have successfully run the HTT engine outside the database, typically when running with a Java controller program.

Figures 3, 4:
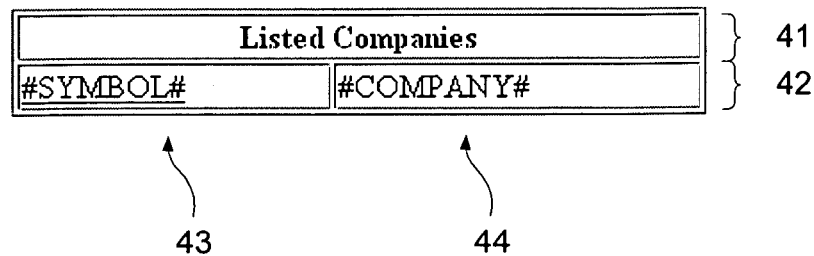
FIG. 3 is a code segment showing, by way of example, a HTT template.
FIG. 4 is a screen shot showing, by way of example, a Web page generated from the HTT template of FIG. 3.

FIG. 3 is a code segment showing, by way of example, an HTT template 35. Each HTT template 35 is a Web page script with embedded markers indicating the relative location for dynamic content insertion. In the described embodiment, Web pages are written in HTML and markers are simple identifiers delimited by a pair of pound signs ("#") with no white space.

The HTT engine 22 locates and parses the HTT template 35 and creates an in-memory hierarchy of display regions.

The display regions correspond to the HTML content specified by pairs of selected structural tags. Each display region is stored as a node in a parse tree and successive layers of nested structural tags are stored as levels within the parse tree. Parse trees are further described below with reference to FIG. 5.

FIG. 4 is a screen shot showing, by way of example, a visual representation of an HTT template 35 of FIG. 3, such as might be shown by an HTML editor. The HTT template 35 defines a table 40 with a heading row 41 containing static text and a data row 42 containing two cells. The data row 42 includes two markers, #SYMBOL# 43 and #COMPANY# 44. Another marker, #HREF# is in the template, but is not displayable as visible content. The markers 43, 44 indicate the relative locations within the Web page at which dynamic content should be inserted.

A controller program 31 (shown in FIG. 2) drives the dynamic generation of Web pages by specifying the display regions within the HTT template 35 to include. By default, all display regions with embedded markers, as well as any parent display regions in the parse tree, are deleted and no code for that section of any dynamically generated Web pages 34 is generated. Display regions with embedded markers specifically indicated in a controller script 31 and those display regions without embedded markers are displayed. Marker substitutions can be repeated by duplicating the corresponding display regions in the output tree as many times as is necessary. "Fixed" and "sliding" modes are also available to determine exactly where new display regions will be placed in the output tree, as further described below.

For example, a controller script 31 written in PL/SQL to generate a dynamic Web page from the HTT template 35 shown in FIG. 3 is as follows:

BEGIN
htt.get ('companies.html');
htt.sub ('HREF', 'http://www.acme.com');
htt.sub ('SYMBOL', 'ACME');
htt.sub ('COMPANY', 'ACME Corporation');
htt.break;
htt.sub ('HREF', 'http://www.orcl.com');
htt.sub ('SYMBOL', 'ORCL');
htt.sub ('COMPANY', 'Oracle Corporation');
htt.showpage;
END;

where htt.get specifies the name of the HTT template 35 as "companies.html," htt.sub specifies the markers to replace, "HREF," "SYMBOL" and "COMPANY," and the replacement dynamic data, "http://www.acme.com," "ACME" and "ACME Corporation," respectively, htt.break directs the HTT engine 22 to insert a new display region as a parent to the last display region substituted, and htt.showpage directs the HTT engine 22 to send the generated Web page to the Web browser. Since this controller program 31 specifies all three markers, no display regions will be deleted.

Also, the display region corresponding to the TH element in the template (shown on line 8 of FIG. 3) will be output if any substitution is made on any of the three markers. The TH element contains only static text and is part of the surrounding TABLE region. Consequently, the display region corresponding to the TH element must be output as part of the table and is a required part of the output for the TD regions.

There are two distinct substitution modes. In "fixed" mode, the HTT engine 22 fixes the ordering of display regions in the output to match the ordering of the markers specified in the HTT templates 35. In "sliding" mode, the HTT engine 22 allows the controller programs 31 to specify the ordering of display regions. Display regions can only "slide" in relation to peer display regions inheriting from a common ancestor display region in the parse tree.

The present approach allows many-to-many relationships between controller programs 31 and HTT templates 35. As well, different versions of HTT templates 35 can be used with different controller programs 31 for increased flexibility and functionality.

Figure 5:
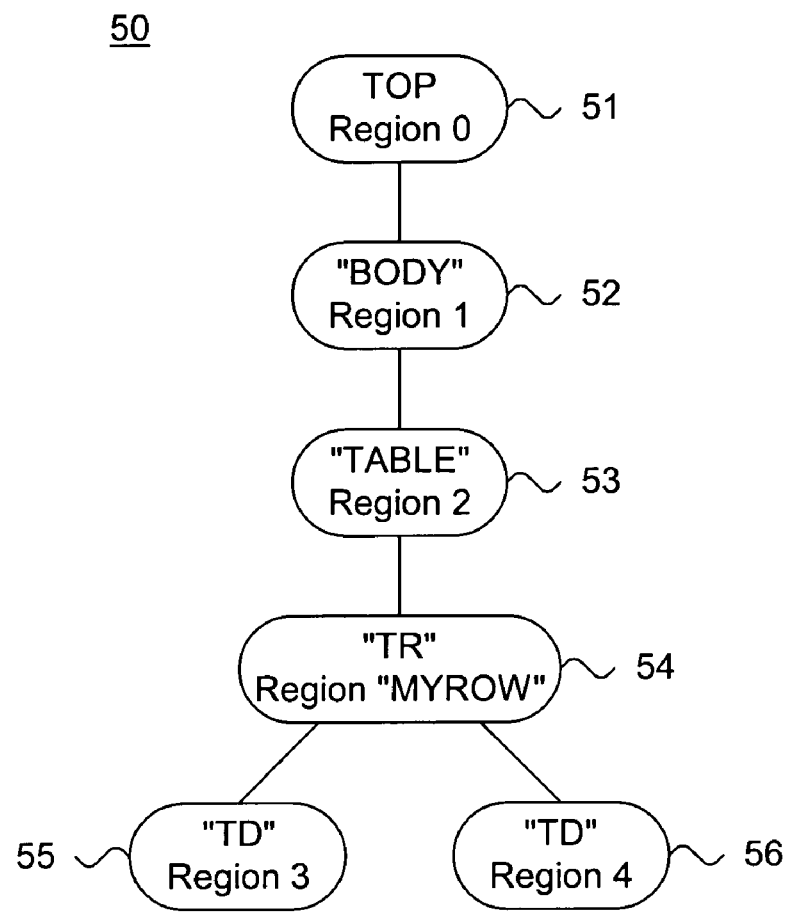
FIG. 5 is a tree diagram showing, by way of example, a parse tree generated from the HTT template of FIG. 3.

FIG. 5 is a tree diagram showing, by way of example, a parse tree 50 generated from the HTT template 35 of FIG. 3. Each parse tree represents the structure of a template as an implicit template hierarchy by forming a data structure reflecting the nesting of individual page layout elements. The HTML language, for instance, defines a hierarchy of page elements, specified by delimiter tags that are generally specified in pairs. Although most HTML tags can be nested, only a few of these tags actually affect the overall layout of the Web page. A list of the recognized HTML structural tags that have particular impact on the layout of a Web page is shown in Table 1.

TABLE 1

| TAGS | | DESCRIPTION |
| --- | --- | --- |
| <HEAD> | </HEAD> | Delimits non displayable part of the HTML |
| <STYLE> | </STYLE> | Contains the stylesheet directives. |
| <TABLE> | </TABLE> | Defines a table |
| <TH> | </TH> | Defines a table header |
| <TR> | </TR> | Defines a horizontal row of table data |
| <TD> | </TD> | Defines an individual cell of table data |
| <UL> | </UL> | Defines unordered list |
| <OL> | </OL> | Defines an ordered list |
| <LI> | </LI> | Defines a list item |
| <FORM> | </FORM> | Contains data input elements. |
| <SELECT> | </SELECT> | Specifies a collection of input list options |
| <OPTION> | </OPTION> | Specifies an input list option |
| <DIV> | </DIV> | Defines a rectangular area |
| <SPAN> | </SPAN> | Defines a non-rectangular area |

The example parse tree 50 consists of six nodes structured into five linked layers. Thus, the tree reflects six structural tag pairs with five layers of nesting. The first node 51, "Region 0," establishes the root of the hierarchy. The second node 52 and third node 53, "Region 1" and "Region 2," correspond to the pair of "BODY" and "TABLE" tags on lines 5 and 15, and 6 and 14, respectively. The actual tags are nested within each other in the template. Consequently, the nodes associated with each of the tags is placed on a successive layer of the parse tree 50.

The fourth node 53, "Region MYROW" corresponds to the pair of "TR" tags on lines 10 and 13 in the template. However, since this tag has an identifier (ID) attributed, the display region is descriptively labeled using the identifier. This descriptive label can be used to select between two markers of the same name within the template. Finally, the fifth node 55, "Region 3," and sixth node 56, "Region 4," which correspond to the pair of "TD" tags on lines 11 and 12, are nested at equal levels within the template and these nodes appear within the same layer of the parse tree 50. Other data structures could be used.

Figure 6:
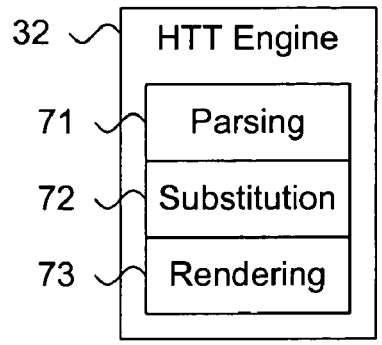
FIG. 6 is a block diagram showing the functional software modules of the HTT engine of FIG. 1.

FIG. 6 is a block diagram showing the functional software modules 70 of the HTT engine 32 of FIG. 1. Each module is a computer program or procedure written as source code in a conventional programming language, such as the Java programming language, and is presented for execution by the CPU as object or byte code, as is known in the art. The various implementations of the source code and object and byte codes can be held on a computer-readable storage medium or embodied on a transmission medium in a carrier wave. The server 11 operates in accordance with a sequence of process steps, as further described below beginning with reference to FIG. 7.

The HTT engine 32 includes three main modules: parsing 71, substitution 73, and rendering 74. The parsing module 71 parses the HTT template and generates the parse tree 50. The substitution module 72 creates an output tree by consulting the parse tree 50. Finally, the rendering module 73 outputs the generated dynamic Web page 34 into an output buffer.

Figure 7:
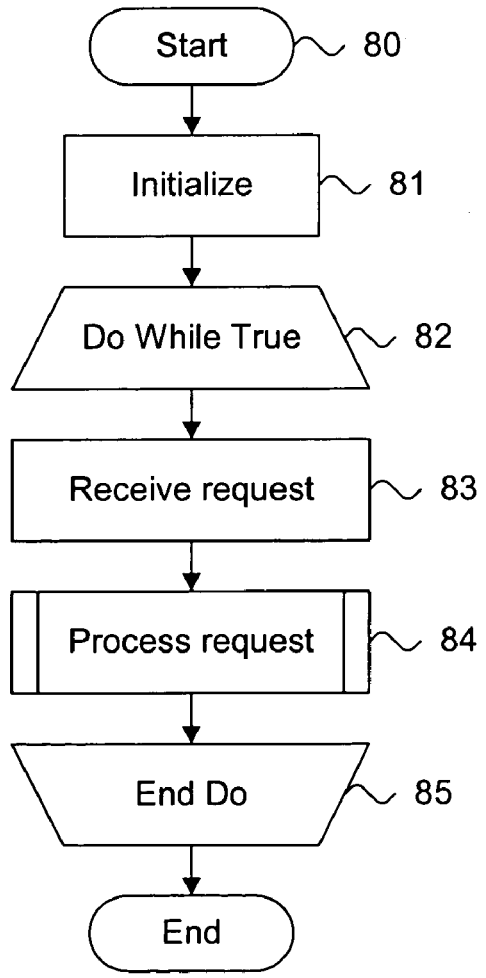
FIG. 7 is a flow diagram showing a method for dynamically generating Web document content using a rules-based engine and implicit template hierarchy in accordance with the present invention.

FIG. 7 is a flow diagram showing a method 80 for dynamically generating Web document content using a rules-based engine and implicit template hierarchy. The HTT engine 22 operates in two phases: initialization (block 81) and processing (blocks 82–85). During initialization (block 81), the HTT engine 32 accesses the database 26 by opening a connection to the database engine 23 (shown in FIG. 1). Processing (blocks 82–85) occurs in an iterative loop. During each iteration, requests for Web pages are received (block 83) and processed (block 84), as further described below with reference to FIG. 8. Processing continues until the program is terminated.

Figure 8:
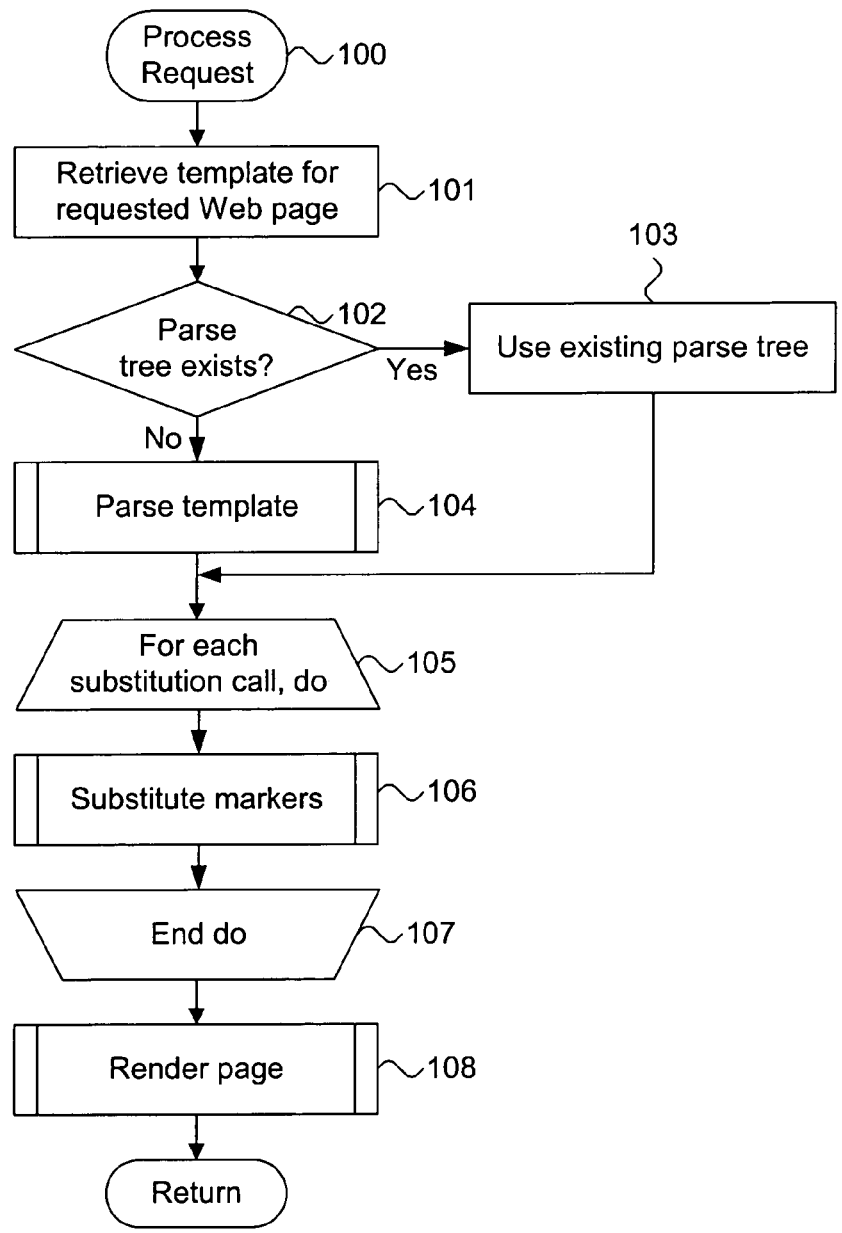
FIG. 8 is a flow diagram showing a routine for executing an HTT template for use in the method of FIG. 7.

FIG. 8 is a flow diagram showing a routine 100 for executing an HTT template for use in the method of FIG. 7. The purpose of this routine is to process each Web page request and generate dynamic content per a controller program 31 (shown in FIG. 2). An HTT template 35 is retrieved from the HTT template repository 32 in response to a get call from the controller program 31 (block 101). If a parse tree 50 already exists for this template (block 102), the HTT template 35 is not retrieved and the existing parse tree 50 is used (block 103). Otherwise, the retrieved template 35 is parsed to build a parse tree 50 representing the display regions within the template (block 104), as further described below with reference to FIG. 9.

Next, the markers are iteratively substituted (blocks 105–107) in response to each sub call from the controller program 31. Each display region for each marker in the HTT template 35 for which a substitution is specified in the controller program 31 is placed into the output tree (block 106), as further described below with reference to FIG. 10. The marker substitution is repeated for each sub call (blocks 105–107).

Finally, the resultant Web page, is rendered in response to a showpage call from the controller program 31 by sending the page to the requesting browser application 27 (shown in FIG. 1) (block 108), as further described below with reference to FIG. 11. The routine then returns.

Figure 9:
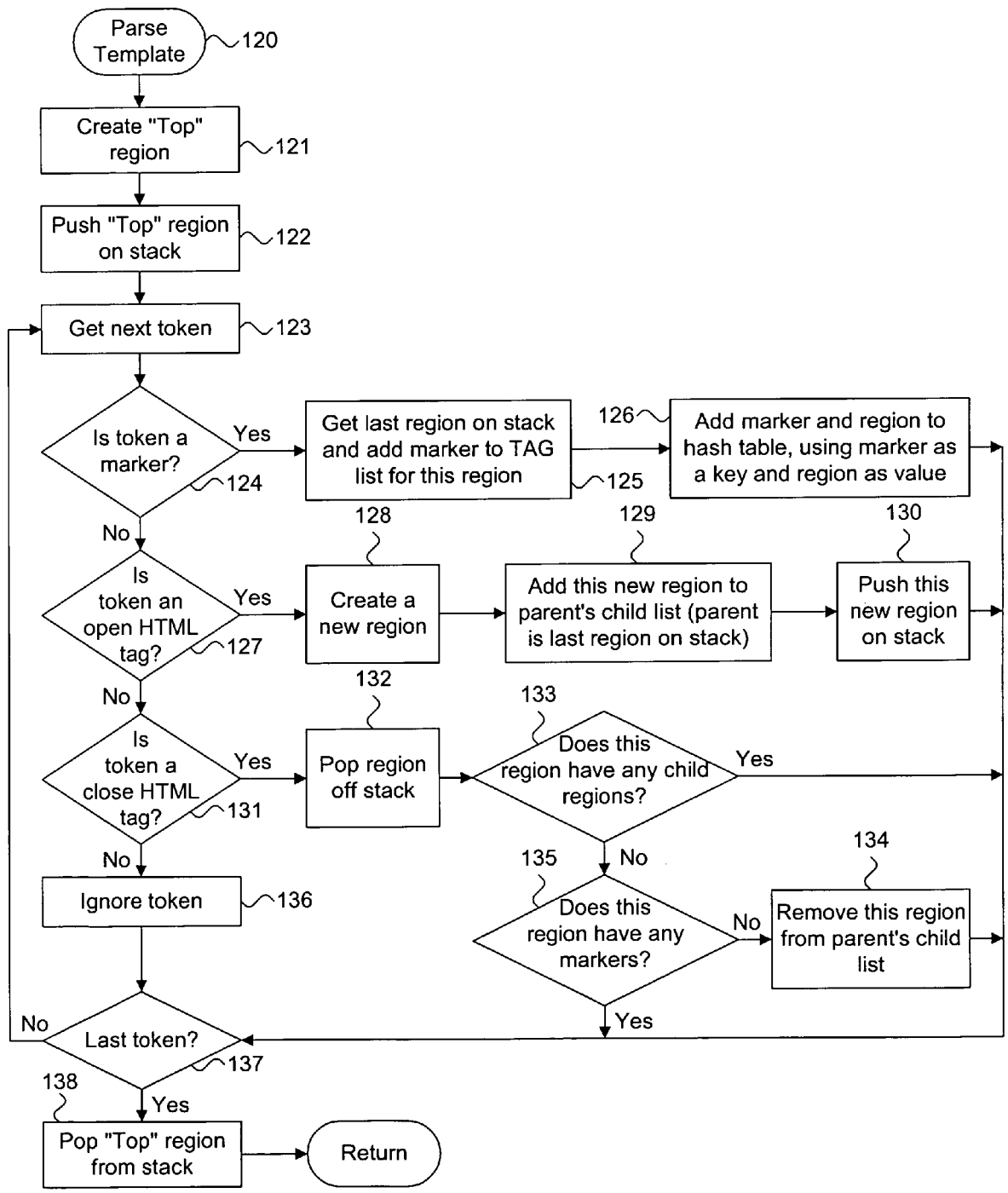
FIG. 9 is a flow diagram showing a routine for parsing an HTT template for use in the routine of FIG. 8.

FIG. 9 is a flow diagram showing a routine 120 for parsing an HTT template 35 for use in the routine of FIG. 8. The purpose of this routine is to define display regions in the parse tree 50. The parse tree 50 is structured as a hierarchy of nodes with one node per display region. For convenience, these nodes are simply referred to as regions. A "Top" display region 51 is created to form the root of the parse tree 50 (block 121). This "Top" display region is pushed onto a memory stack (block 122). The memory stack is used to track the nesting levels of embedded display regions. The remainder of the routine 120 iteratively processes each "token" (blocks 123–137) as follows.

The HTT template 35 is tokenized, that is, each non-white space word is identified and formed into an ordered list of words. Each next token is removed from this internal list (block 123) and analyzed. During token analysis, if the token is a marker, (block 124), the last display region pushed onto the stack is retrieved and the present marker is added to the tag list for this region (block 125). The marker and display region are then added to a hash table, using the marker as a hash key and the display region as a value (block 126). The hash table is used to efficiently process display regions and markers. If this token is not the last token (block 137), iterative processing continues with the next token (block 123). Otherwise, the "Top" display region is popped from the stack (block 138) and the routine returns.

Continuing with token analysis, if the token is an open. HTML tag (block 127), a new display region is created (block 128). This new display region is added to the parent display region's child list (block 129), as the parent display region is the last display region on the top of the stack. This new display region is then pushed onto the stack (block 130). As before, if this token is not the last token (block 137), iterative processing continues with the next token (block 123). Otherwise, the "Top" display region is popped from the stack (block 138) and the routine returns.

Continuing again with token analysis, if the token is a close HTML tag (block 136), the topmost display region is popped off the stack (block 132). If this display region does not have any child display regions (block 133) and if this display region does not have any markers (block 135), this display region is removed from the parent display region's child list (block 134). As before, if this token is not the last token (block 137), iterative processing continues with the next token (block 123). Otherwise, the "Top" display region is popped from the stack (block 138) and the routine returns.

Completing token analysis, if the token is not a close HTML tag (block 136), the token is ignored (block 136). As before, if this token is not the last token (block 137), iterative processing continues with the next token (block 123). Otherwise, the "Top" display region is popped from the stack (block 138) and the routine returns.

Figure 10:
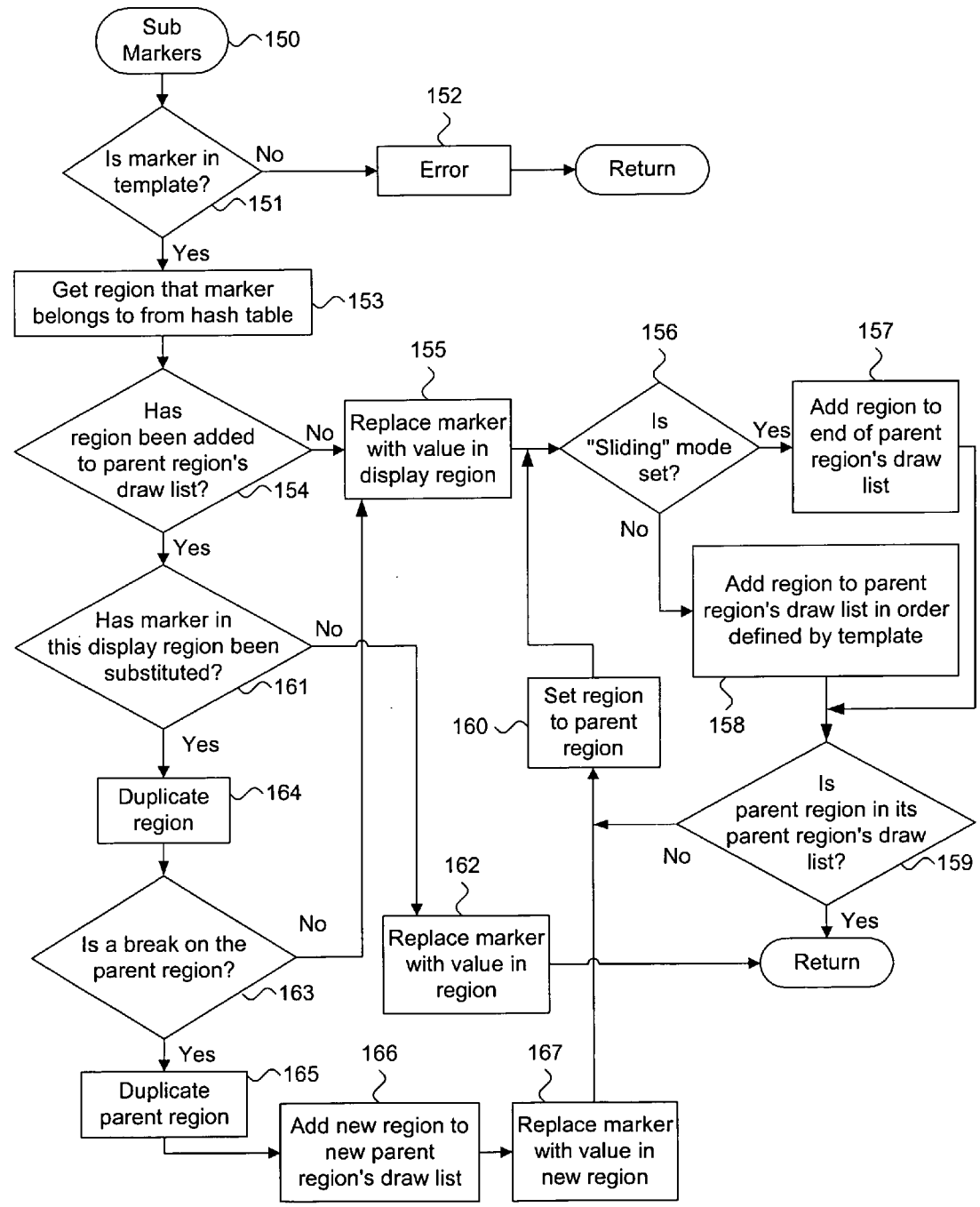
FIG. 10 is a flow diagram showing a routine for substituting markers for use in the routine of FIG. 8.

FIG. 10 is a flow diagram showing a routine 140 for substituting markers for use in the routine of FIG. 8. The purpose of this routine is to populate the output tree, also referred to as the "draw list." Preliminarily, if the current marker is not in the retrieved HTT template 35 (block 151), an error condition exists (block 152) and the routine returns. Otherwise, the display region to which the current marker belongs is retrieved from the hash table (block 153). The marker is then processed as follows.

If the display region has not been added to the parent display region's draw list (block 154), the marker is replaced with a value in the display region (block 155). If "Sliding mode" is set (block 156), the display region is added to the end of the draw list for the parent display region (block 157). "Sliding" mode allows the ordering of the output to be determined by the order of the occurrence of markers. Otherwise, if "Sliding" mode is not set (block 156), "Fixed" mode is set and the display region is added to the draw list of the parent display region in the order defined by the template (block 158). Whether in "Fixed" or "Sliding" modes (blocks 158 and 157, respectively), if the parent region is in the drawing list of its parent region, that is, the parent region is in the output tree, the display region (or region being processed) is set to the parent region (block 160) and the "Sliding" or "Fixed" mode determination and outputting operations are repeated (blocks 156–158) until no further parent regions are found (block 159). The routine then returns. The effect of this processing loop (blocks 156 through 160) is to walk up the parse tree, making sure that all enclosing display regions are properly included in the output tree.

Continuing with marker processing, if the marker in the current display region has not already been substituted (block 161), the marker is replaced with a value in the display region (block 162) and the routine returns.

Continuing with marker processing, if the marker in the current display region has already been substituted (block 161), the display region is duplicated (block 164). If there is no break in the parent display region (block 163), the marker is replaced with a value in the new display region (block 155). The "Sliding" or "Fixed" mode determination and outputting operations are performed and repeated (blocks 156–158) until no further parent regions are found (block 159). The routine then returns.

Completing marker processing, if there is a break in the parent display region (block 163), the parent region of the display region is duplicated (block 165) and a new region is added to the draw list of the new parent display region (block 166). The marker is replaced with a value in the display region (block 167) and the display region is set to the new parent display region (block 160). The "Sliding" or "Fixed" mode determination and outputting operations are performed and repeated (blocks 156–158) until no further parent regions are found (block 159). The routine then returns.

Figure 11:
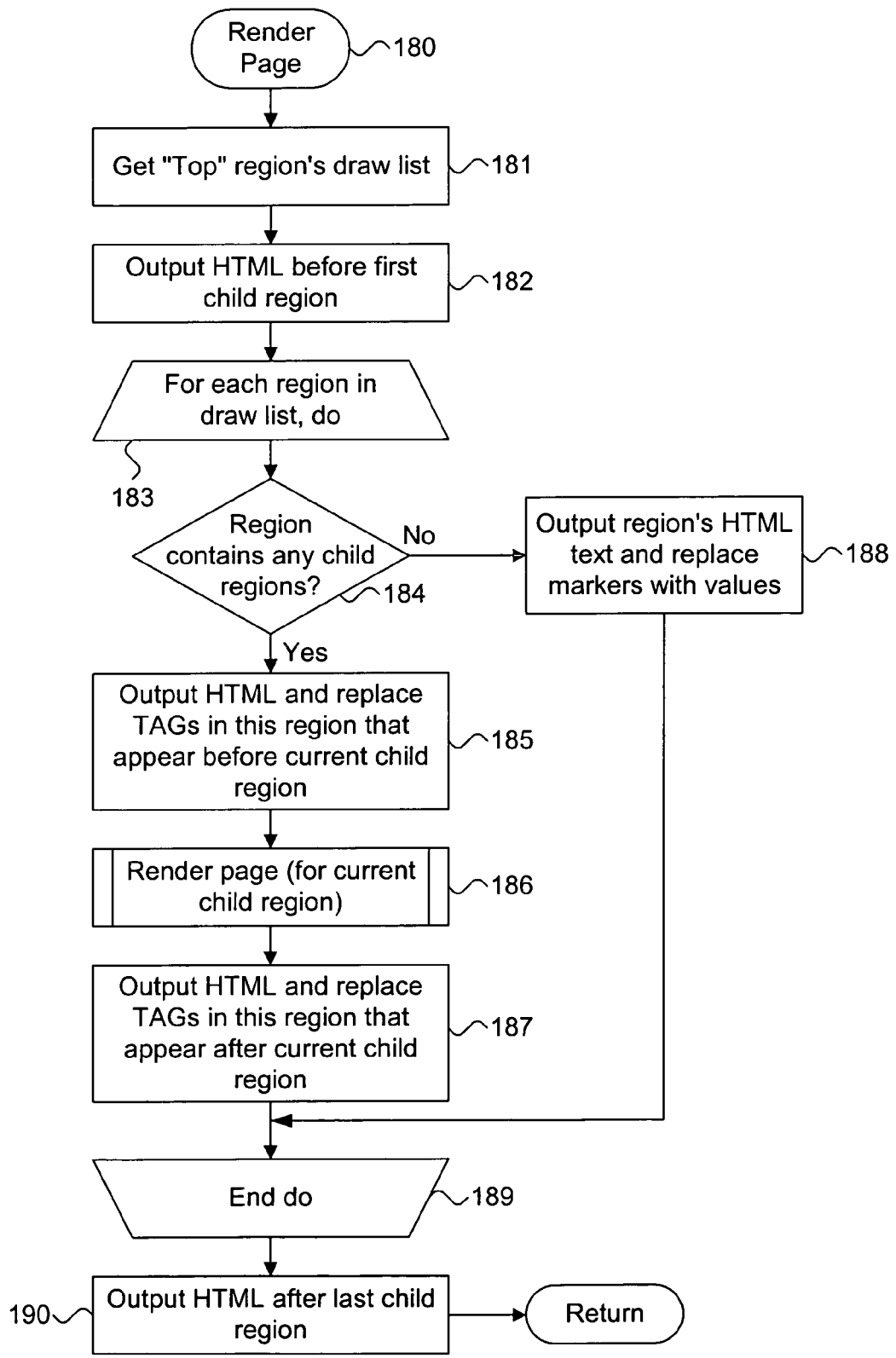
FIG. 11 is a flow diagram showing a routine for rendering a dynamically generated Web page for use in the routine of FIG. 8.

FIG. 11 is a flow diagram showing a routine for rendering a dynamically generated Web page for use in the routine of FIG. 8. The purpose of this routine is to generate a HTML Web page. First, the draw list for the "Top" display region is retrieved (block 181) and any HTML code occurring before the first child display region is output (block 182). Next, each display region in the draw list is iteratively processed (blocks 183–189), as follows.

If the current display region contains any child regions (block 184), the HTML code is output and any markers in this display region that appear before the child regions are replaced (block 185). This routine is recursively called to render each child region (block 186). Finally, the HTML code is output and any markers in this display region that appear after the child regions are replaced (block 187). If the current display region does not contain any child regions (block 184), the HTML code is output and any markers in this display region are replaced with values (block 188).

Upon the completion of iterative processing (blocks 183–189), any HTML code occurring after the last child region is output (block 190), after which the routine returns.

While the invention has been particularly shown and described as referenced to the embodiments thereof, those skilled in the art will understand that the foregoing and other changes in form and detail may be made therein without departing from the spirit and scope of the invention.

What is claimed is:

1. A method for generating web pages, comprising:
storing a preconstructed web page;
storing, separate from said preconstructed web page, correlation data that specifies a correlation between an identifier and replacement content;
receiving a request for a requested web page that corresponds to said preconstructed web page;
in response to said request, retrieving said preconstructed web page, wherein:
said preconstructed web page was created prior to receiving said request,
said preconstructed web page is written in a tag-delimited page description language, and
said preconstructed web page includes said identifier that is located at a position between a pair of tags within said preconstructed web page;
in response to said request, modifying said preconstructed web page to produce said requested web page by causing a program to perform the steps of:
removing said identifier from said preconstructed web page, and
inserting said replacement content at said position in said preconstructed web page, wherein said replacement content is selected based on the correlation data; and
providing said requested web page in response to said request.

2. The method as recited in claim 1, wherein removing said identifier and inserting said replacement content further includes substituting replacement text for said identifier in said preconstructed web page.

3. The method as recited in claim 1, wherein:
said identifier is a first identifier and said position is a first position;
said preconstructed web page includes a second identifier that is located at a second position between another pair of tags within said preconstructed web page;
said preconstructed web page includes first code, written in said tag-delimited page description language, that describes a first display region, and second code, written in said tag-delimited page description language, that describes a second display region, wherein said first code includes said first identifier, wherein said second code includes said second identifiers,
wherein said first display region corresponds to a first set of content specified by a first pair of tags, and wherein said second display region corresponds to a second set of content specified by a second pair of tags; and
modifying said preconstructed web page to produce said requested web page further comprises causing said program to arrange an ordering of said first display region and said second display region in said requested web page based on an ordering of said first position and said second position in said preconstructed web page.

4. The method as recited in claim 1, wherein:
said program is a first program, said identifier is a first identifier, and said position is a first position;
said preconstructed web page includes a second identifier that is located at a second position between another pair of tags within said preconstructed web page; and
said preconstructed web page includes first code, written in said tag-delimited page description language, that describes a first display region and second code, written in said tag-delimited page description language, that describes a second display region, wherein said first code includes said first identifier, and wherein said second code includes said second identifier,
wherein said first display region corresponds to a first set of content specified by a first pair of tags, and wherein said second display region corresponds to a second set of content specified by a second pair of tags;
modifying said preconstructed web page to produce said requested web page further comprises causing said program to arrange an ordering of said first display region and said second display region in said requested web page based on an ordering specified by a second program.

5. The method as recited in claim 1, wherein said tag-delimited page description language is selected from the group consisting of hypertext markup language (HTML) and extensible markup language (XML).

6. The method as recited in claim 1, further comprising:
parsing said preconstructed web page to generate a hierarchical representation of said preconstructed web page, wherein said hierarchical representation is based on a structure of said preconstructed web page; and
based on said hierarchical representation, processing said preconstructed web page to locate said identifier.

7. The method as recited in claim 1, wherein:
said preconstructed web page defines a plurality of display regions; and
code, written in said tag-delimited page description language, that describes how to render one display region, of said plurality of display regions, includes said identifier.

8. The method as recited in claim 7, wherein:
said identifier is a first identifier, said position is a first position, and said code that describes how to render one display region is first code that describes how to render a first display region;
said preconstructed web page includes said first code;
said preconstructed web page includes second code, written in said tag-delimited page description language, that describes how to render a second display region, wherein said second code includes a second identifier that is located at a second position between another pair of tags within said preconstructed web page;
said preconstructed web page includes third code, written in said tag-delimited page description language, that describes how to render a third display region, wherein said third code includes no identifiers;
the step of modifying said preconstructed web page to produce said requested web page comprises:
including said first display region in said requested web page because said replacement content replaces said first identifier;
not including said second display region in said requested web page because no replacement content replaces said second identifier; and
including said third display region in said requested web page because said third code includes no identifiers.

9. The method as recited in claim 1, wherein:
said program is a hypertext template engine; and
a controller program performs the step of modifying said preconstructed web page to produce said requested web page by causing said hypertext template engine to perform the steps of removing and inserting.

10. The method of claim 9, wherein said controller program modifying said preconstructed web page to produce said requested web page by causing said hypertext template engine to perform the steps of removing and inserting further comprises:
said controller program making a substitution call to said hypertext template engine, wherein said substitution call specifies said identifier and said replacement content.

11. The method as recited in claim 1, wherein:
said identifier is a first identifier, said position is a first position, and said replacement content is first replacement content;
said preconstructed web page includes a second identifier that is located at a second position between another pair of tags within said preconstructed web page; and
modifying said preconstructed web page to produce said requested web page further comprises causing said program to substitute second replacement content for said second identifier in said preconstructed web page.

12. The method as recited in claim 1, wherein:
said identifier is a first occurrence of said identifier;
said position is a first position;
said preconstructed web page includes a second occurrence of said identifier that is located at a second position between another pair of tags within said preconstructed web page; and
modifying said preconstructed web page to produce said requested web page further comprises causing said program to perform the steps of:
removing said second occurrence of said identifier from said preconstructed web page, and
inserting said replacement content at said second position in said preconstructed web page.

13. A computer-readable medium for generating web pages, the computer-readable medium carrying instructions which, when executed by one or more processors, cause performance of the steps of:
storing a preconstructed web page;
storing, separate from said preconstructed web page, correlation data that specifies a correlation between an identifier and replacement content;
receiving a request for a requested web page that corresponds to said preconstructed web page;
in response to said request, retrieving a said preconstructed web page, wherein:
said preconstructed web page was created prior to receiving said request,
said preconstructed web page is written in a tag-delimited page description language, and
said preconstructed web page includes an said identifier that is located at a position between a pair of tags within said preconstructed web page;
in response to said request, modifying said preconstructed web page to produce said requested web page by causing a program to perform the steps of:
removing said identifier from said preconstructed web page, and
inserting said replacement content at said position in said preconstructed web page, wherein said replacement content is selected based on the correlation data; and
providing said requested web page in response to said request.

14. The computer-readable medium as recited in claim 13, wherein the instructions for removing said identifier and inserting said replacement content further comprise instructions which, when executed by the one or more processors, cause substituting replacement text for said identifier in said preconstructed web page.

15. The computer-readable medium as recited in claim 13, wherein:

said identifier is a first identifier and said position is a first position;

said preconstructed web page includes a second identifier that is located at a second position between another pair of tags within said preconstructed web page; and said preconstructed web page includes first code, written in said tag-delimited page description language, that describes a first display region, and second code, written in said tag-delimited page description language, that describes a second display region, wherein said first code includes said first identifier, and wherein said second code includes said second identifier, wherein said first display region corresponds to a first set of content specified by a first pair of tags, and wherein said second display region corresponds to a second set of content specified by a second pair of tags; and the instructions for modifying said preconstructed web page to produce said requested web page further comprise instructions which, when executed by the one or more processors, cause said program to arrange said first code that corresponds to said first display region and said second code that corresponds to said second display region in said requested web page based on an ordering of said first position and said second position in said preconstructed web page.

16. The computer-readable medium as recited in claim 13, wherein:

said program is a first program, said identifier is a first identifier, and said position is a first position;

said preconstructed web page includes a second identifier that is located at a second position between another pair of tags within said preconstructed web page; and said preconstructed web page includes first code, written in said tag-delimited page description language, that describes a first display region, and second code, written in said tag-delimited page description language, that describes a second display region, wherein said first code includes said first identifier, and wherein said second code includes said second identifier, wherein said first display region corresponds to a first set of content specified by a first pair of tags, and wherein said second display region corresponds to a second set of content specified by a second pair of tags;

the instructions for modifying said preconstructed web page to produce said requested web page further comprise instructions which, when executed by the one or more processors, cause said program to arrange said first code that corresponds to said first display region and said second code that corresponds to said second display region in said requested web page based on an ordering specified by a second program.

17. The computer-readable medium as recited in claim 13, wherein:

said tag-delimited page description language is selected from the group consisting of hypertext markup language (HTML) and extensible markup language (XML).

18. The computer-readable medium as recited in claim 13, further comprising instructions which, when executed by the one or more processors, cause performance of the steps of:

parsing said preconstructed web page to generate a hierarchical representation of said preconstructed web page, wherein said hierarchical representation is based on a structure of said preconstructed web page; and based on said hierarchical representation, processing said preconstructed web page to locate said identifier.

19. The computer-readable medium as recited in claim 13, wherein:

said preconstructed web page defines a plurality of display regions; and code, written in said tag-delimited page description language, that describes how to render one display regions, of said plurality of display regions, includes said identifier.

20. The computer-readable medium as recited in claim 19, wherein:

said identifier is a first identifier, said position is a first position, and said code that describes how to render one display region is first code that describes how to render a first display region;

said preconstructed web page includes said first code;

said preconstructed web page includes second code, written in said tag-delimited page description language, that describes how to render a second display region, wherein said second code includes a second identifier that is located at a second position between another pair of tags within said preconstructed web page;

said preconstructed web page includes third code, written in said tag-delimited page description language, that describes how to render a third display region, wherein said third code includes no identifiers;

the computer-readable medium further comprises instructions which, when executed by the one or more processors, cause:

including said first display region in said requested web page because said replacement content replaces said first identifier;

not including said second display region in said requested web page because no replacement content replaces said second identifier; and including said third display region in said requested web page because said third code includes no identifiers.

21. The computer-readable medium as recited in claim 13, wherein:

said program is a hypertext template engine; and a controller program performs the step of modifying said preconstructed web page to produce said requested web page by causing said hypertext template engine to perform the steps of removing and inserting.

22. The computer-readable medium of claim 21, wherein the instructions for said controller program modifying said preconstructed web page to produce said requested web page by causing said hypertext template engine to perform the steps of removing and inserting further comprises instructions which, when executed by the one or more processors, cause:

said controller program making a substitution call to said hypertext template engine, wherein said substitution call specifies said identifier and said replacement content.

23. The computer-readable medium as recited in claim 13, wherein:
said identifier is a first identifier, said position is a first position, and said replacement content is first replacement content;
said preconstructed web page includes a second identifier that is located at a second position between another pair of tags within said preconstructed web page; and
the instructions for modifying said preconstructed web page to produce said requested web page further comprise instructions which, when executed by the one or more processors, cause said program to substitute second replacement content for said second identifier in said preconstructed web page.

24. The computer-readable medium as recited in claim 13, wherein:
said identifier is a first occurrence of said identifier;
said position is a first position;
said preconstructed web page includes a second occurrence of said identifier that is located at a second position between another pair of tags within said preconstructed web page; and
the instructions for modifying said preconstructed web page to produce said requested web page further comprise instructions which, when executed by the one or more processors, cause said program to perform the steps of:
removing said second occurrence of said identifier from said preconstructed web page, and
inserting said replacement content at said second position in said preconstructed web page.

* * * * *

UNITED STATES PATENT AND TRADEMARK OFFICE
CERTIFICATE OF CORRECTION

| | |
|---|---|
| PATENT NO. | : 7,117,436 B1 |
| APPLICATION NO. | : 09/654998 |
| DATED | : October 3, 2006 |
| INVENTOR(S) | : Cameron Gene O'Rourke |

It is certified that error appears in the above-identified patent and that said Letters Patent is hereby corrected as shown below:

COLUMN 12

Claim 3: Line 30, delete "identifiers" and insert --identifier--.

COLUMN 16

Claim 19: Line 18, delete "regions" and insert --region--.

Signed and Sealed this

Thirtieth Day of January, 2007

JON W. DUDAS
*Director of the United States Patent and Trademark Office*

UNITED STATES PATENT AND TRADEMARK OFFICE
CERTIFICATE OF CORRECTION

PATENT NO. : 7,117,436 B1 Page 1 of 1
APPLICATION NO. : 09/654998
DATED : October 3, 2006
INVENTOR(S) : Cameron Gene O'Rourke It is certified that error appears in the above-identified patent and that said Letters Patent is hereby corrected as shown below:

Title page, item (73) Assignee: Please delete "Oracle Corporation" and substitute --Oracle International Corporation--.

Signed and Sealed this

Twenty-first Day of July, 2009

JOHN DOLL
*Acting Director of the United States Patent and Trademark Office*